US009576153B2

(12) United States Patent
White (10) Patent No.: US 9,576,153 B2
(45) Date of Patent: Feb. 21, 2017

(54) DEVICE AND METHOD FOR PROVIDING INFORMATION FROM A BACKEND COMPONENT TO A FRONTEND COMPONENT BY A SECURE DEVICE MANAGEMENT ABSTRACTION AND UNIFICATION MODULE

(71) Applicant: Cellco Partnership, Arlington, VA (US)

(72) Inventor: Brian M. White, Port Murray, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 138 days.

(21) Appl. No.: 13/974,619

(22) Filed: Aug. 23, 2013

(65) Prior Publication Data

US 2015/0059006 A1    Feb. 26, 2015

(51) Int. Cl.
| G06F 21/00 | (2013.01) |
| G06F 21/62 | (2013.01) |
| H04W 4/00 | (2009.01) |
| G06F 9/46 | (2006.01) |
| H04W 12/06 | (2009.01) |
| H04L 29/06 | (2006.01) |

(52) U.S. Cl.
CPC .......... *G06F 21/6236* (2013.01); *H04W 4/001* (2013.01); *G06F 9/468* (2013.01); *H04L 63/0823* (2013.01); *H04W 12/06* (2013.01)

(58) Field of Classification Search
CPC .. G06F 21/30165; G06F 9/468; G06F 21/564; H04L 41/046
USPC .......................................................... 726/30
See application file for complete search history.

(56) References Cited

U.S. PATENT DOCUMENTS

| 6,148,342 | A   | * | 11/2000 | Ho ................................ 709/225 |
| 7,309,004 | B1  | * | 12/2007 | Muschellack ........ G06Q 20/042 235/379 |
| 7,334,254 | B1  | * | 2/2008  | Boydstun et al. ................ 726/2 |
| 8,201,161 | B2  | * | 6/2012  | Challener et al. ............. 717/168 |
| 8,725,123 | B2  | * | 5/2014  | Raleigh ................. H04L 41/046 455/414.1 |
| 9,208,334 | B2  | * | 12/2015 | Zhao .................... G06F 21/6209 |
| 2003/0182414 | A1 | * | 9/2003 | O'Neill ......................... 709/223 |
| 2004/0127190 | A1 | * | 7/2004 | Hansson ................. G06F 9/468 455/403 |
| 2007/0168317 | A1 | * | 7/2007 | Ikeyama .......................... 707/1 |
| 2007/0300241 | A1 | * | 12/2007 | Prakash et al. ............... 719/321 |
| 2008/0077973 | A1 | * | 3/2008 | Zimmer .................. G06F 9/468 726/2 |
| 2008/0207224 | A1 | * | 8/2008 | Fahmy .................. G01S 5/0205 455/456.2 |
| 2010/0212012 | A1 | * | 8/2010 | Touboul et al. ................ 726/23 |

(Continued)

*Primary Examiner* — Hadi Armouche
*Assistant Examiner* — Bryan Wright (57) ABSTRACT

An exemplary system that includes a computing device that stores an abstraction and unification module, the abstraction and unification module being executable by a processor of the computing device to receive from a frontend component a request for information located within a backend component of the computing device and validate that the frontend component is authorized to receive the information specified in the request. The abstraction and unification module may further pass the request to an abstraction engine that extracts the information from the backend component and provides the information extracted from the backend component to frontend component.

17 Claims, 3 Drawing Sheets

(56) References Cited

U.S. PATENT DOCUMENTS

| | | | | |
|---|---|---|---|---|
| 2011/0099157 A1* | 4/2011 | Lebeau et al. | | 707/706 |
| 2011/0173643 A1* | 7/2011 | Nicolson | G06F 21/575 | 719/328 |
| 2011/0314271 A1* | 12/2011 | Boccon-Gibod | G06F 21/6218 | 713/151 |
| 2013/0263269 A1* | 10/2013 | Palumbo | G06F 21/564 | 726/24 |
| 2013/0347064 A1* | 12/2013 | Aissi | G06F 21/30 | 726/2 |
| 2014/0004825 A1* | 1/2014 | Prakash | H04W 12/06 | 455/411 |
| 2015/0007190 A1* | 1/2015 | Diefenbaugh | G06F 9/5094 | 718/104 |

\* cited by examiner

DEVICE AND METHOD FOR PROVIDING INFORMATION FROM A BACKEND COMPONENT TO A FRONTEND COMPONENT BY A SECURE DEVICE MANAGEMENT ABSTRACTION AND UNIFICATION MODULE

BACKGROUND

Computing devices, such as wireless-based telecommunication devices, have evolved from point-to-point to all-in-one devices with multiple characteristics, including such things as device settings, networking, voice and video calls, multi-media acquisition/messaging/playback, data storage, and the like. For example, cell phone operability has evolved so much from the humble call-only phones that the term 'smart-phone' is utilized to describe an entire developing class of these all-in-one devices.

Yet, with the increase of device characteristics, the complexity of supporting software has also increased. That is, each all-in-one device employs one or more unique software components to perform operations particular to a characteristic. In turn, an assortment of separate software components (e.g., backend components, such as clients, device drivers, and application programmable interfaces, and frontend components, such as user experience, diagnostic, and analytic applications) have been collected and combined to support the multiple device characteristics, resulting in software fragmentation.

Software fragmentation is an inconsistent combination of software and hardware (e.g., assortment of separate software components) that creates an inconsistent software ecosystem. Inconsistent software ecosystems intrinsically include communication problems between the software components due to varying code-standards and possess security risks due to software component integration flaws. Further, inconsistent software ecosystem may also limit scalability since any increase in the number unique software components may equate to an increase of communication and security problems.

Thus, the increase of device operability has resulted in a trend of software fragmentation that has increased the storage footprint and resource utilization within the all-in-one devices while decreasing software flexibility, security, and scalability.

DETAILED DESCRIPTION

A secure device management abstraction and unification module (SDMAUM) has been developed, which operates as middleware to abstract interactions between backend and frontend components. Abstraction by the SDMAUM results in a consistent communication mechanism for backend and frontend components that perform the operations within an otherwise inconsistent software ecosystem.

For instance, a computing device, which resides on a network within an exemplary communication system, includes on a memory a software ecosystem in which an SDMAUM operates. When the software ecosystem and/or portions thereof, such as an operating system (OS), of the computing device are updated or altered without the SDMAUM, each application (frontend component) must also be modified to interact with the updated or altered OS (e.g., the backend clients, device drivers, and application programmable interfaces (APIs) of the OS). However, a middleware abstraction of these components by the SDMAUM provides the scalability of modifying a single module (i.e., the SDMAUM) when the OS is updated instead of having to modify all frontend components that interact with the backend clients, device drivers, and APIs of the OS.

Thus, regardless of the component variety and/or upgrade status, the middleware modular strategy executed by the SDMAUM provides consistent communication between backend and frontend components. Further, because the middleware modular strategy enables a consistent and secure approach to communicating device information between components, the development of and time-to-production for the new and/or enhanced computing device characteristics (e.g., advanced system settings, networking, voice and video calls, multi-media acquisition/messaging/playback, data storage, mapping systems, speech recognition, internet browsing, etc.) may be respectively simplified and decreased.

Figure 1:
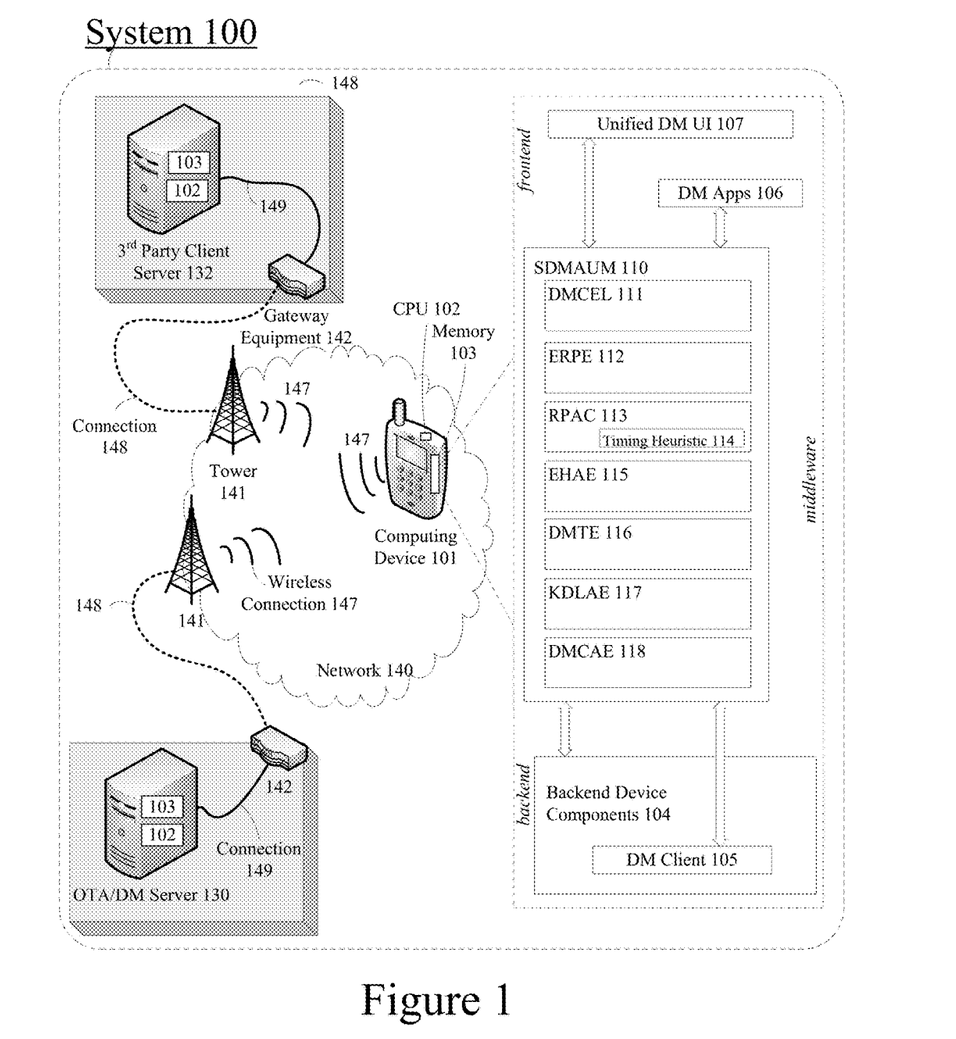
FIG. 1 illustrates an exemplary system in which a secure device management abstraction and unification module operates.

FIG. 1 illustrates an exemplary communication system 100 having computing device 101 that in response to communications received from one or more servers 130, 132 utilizes an SDMAUM 110 to abstract interactions between backend device components (104, 105) and frontend components (106, 107) associated with computing device 101. The exemplary communication system 100 and items therein, such as the computing device 101 and the servers 130, 132, may take many different forms and include multiple and/or alternate components and facilities, e.g., as illustrated in the figures further described below. While exemplary systems, devices, modules, and sub-modules are shown in the figures, the exemplary components illustrated in the Figures are not intended to be limiting. Indeed, additional or alternative components and/or implementations may be used.

As illustrated in FIG. 1, system 100 includes the computing device 101 and the servers 130, 132. The exemplary computing device 101 and servers 130, 132 may be any computing system and/or device that includes a processor and a memory (e.g. 106 and 107, respectively). Computing systems and/or devices generally include computer-executable instructions (e.g., an OS, SDMAUM 110, etc.), where the instructions may be executable by one or more computing devices such as those listed below. Computer-executable instructions may be compiled or interpreted from computer programs created using a variety of programming languages and/or technologies, including, without limitation, and either alone or in combination, Java™, C, C++, Visual Basic, Java Script, Perl, etc.

In general, a processor or a microprocessor (e.g., CPU 102) receives instructions from a memory (e.g., memory 103) and executes these instructions, thereby performing one or more processes, including one or more of the processes described herein. Such instructions and other data may be stored and transmitted using a variety of computer-readable mediums (e.g., memory 103). Further, computing systems and/or devices may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Examples of computing devices include, without limitation, cell phones, smart-phones, super-phones, tablet computers, next generation portable devices, mobile printers, handheld computer, secure voice communication equipment, or some other computing system and/or device. Alternatively, computing devices may also be a computer workstation, a server, a desktop, notebook, or laptop.

The CPU 102 may include processes comprised from any hardware, software, or combination of hardware or software that carries out instructions of a computer programs by performing logical and arithmetical calculations, such as adding or subtracting two or more numbers, comparing numbers, or jumping to a different part of the instructions. For example, the CPU 102 may be any one of, but not limited to, single, dual, triple, or quad core processors (on one single chip), graphics processing units, visual processing units, and virtual processors.

The memory 103 may be, in general, any computer-readable medium (also referred to as a processor-readable medium) that may include any non-transitory (e.g., tangible) medium that participates in providing data (e.g., instructions) that may be read by a computer (e.g., by a CPU 102 of the computer device 105). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the exemplary illustration of FIG. 1, the non-transitory memory 103 of the computing device 101 may store backend device components 104 (e.g., device management (DM) client 105), DM applications (Apps) 106, unified DM user interface (UI) 107, and the SDMAUM 110 as executable instructions within the OS for the computing device 101 executable by the CPU 102 to perform one or more of the processes described herein.

The backend device components 104 may be "device-side" executable instructions that alone or in combination configure and/or operate the physical components of the device (e.g., a touch screen display, antenna, integrated camera, etc.). Examples of backend device components 104 include device drivers, APIs, and device management clients.

A device driver is a computer routine that controls a particular physical component of device or a peripheral (e.g.,
a printer) attached to the device. Similar to a device driver is an OS Layer Kernel, which manages and translates input/output requests into data processing instructions for the central processing unit (e.g., CPU 102). An application programming interface (API) is a set of executable instructions that itemizes and implements the data structures, object classes, and variables that interact with the device drivers to operate physical components and that launch programs.

A device management client may include executable instructions that manage a physical device by setting configurations and diagnostics based on a particular protocol. Device management clients generally manage physical devices via provisioning, configuring, fault managing, and upgrading operations. Provisioning is the enabling and disabling of both physical device components and software components. Configuring is the changing of settings and/or parameters of the device. Fault managing is the monitoring and (sometimes) correcting of errors generated by the physical and software components.

Software upgrading is the loading of new software and/or bug fixes onto the device, including applications and OS upgrades. For example, a device management client may utilize software upgrading operations related to Firmware Over-the-Air (FOTA) operations. FOTA is a process for updating software on computing devices wirelessly or directly "over the air" from the service provider (e.g., a mobile phone provider) to the computing devices. FOTA also allows manufacturers and operators to "push out" firmware upgrades to ensure that the computing devices have the latest software improvements.

Pushing out firmware upgrades may be initiated via a notification service that sends through an open connection notifications from servers to devices. Notifications may generally include badges, sounds, or custom alphanumeric/visual-based alerts. Thus, by utilizing notification services and FOTA operations, a device management client may be configured to receive the wireless distribution of applications, data, and configuration settings for all types of device operations.

The DM client 105 is an example of a device management client. The DM client 105 may, for example, execute a protocol specified by the Open Mobile Alliance, which is a specific to the management of wireless devices, and include a push notification service specified by Google Cloud Messaging or Apple Push Notification Service Management. Therefore, the DM client 105 may be configured to update and manage the computing device 101 configurations and diagnostics based on the Open Mobile Alliance in conjunction with Google Cloud Messaging.

The frontend device components are "user-side" executable instructions that alone or in combination present applications and run applications. Examples of frontend device components include the DM Apps 106 and the unified DM UI 107. An example of presenting an application is the generation and display of a user interface on a display of the computing device 101. An example of running an application may be the continuous operation of a timer feature of a clock application regardless of whether the user interface is on the display of the computing device 101.

The DM Apps 106 may include user experience, diagnostic, and analytic applications (e.g., frontend components), such as third party and/or enterprise application that are specifically-designed to meet the needs and objectives of manufacturers, customers, and service providers. One example of a DM App 106 may include a virtual local area network management policy server (VMPS). The VMPS may include executable instructions configured to run on a computing device 101 that acts as a network switch for mapping the computing device 101 to a virtual local area network (VLAN) and providing general network management. The VMPS thus may allow an authorized computing device 101 to connect to and communicate through a VLAN established by a service provider.

The unified DM UI 107 may include a set of executable instructions for generating and managing user interfaces, which based on a received input, control the device characteristics via the SDMAUM 110 and operate the front components. For instance, the unified DM UI 107 may be configured to generate, present, and provide one or more user interfaces (e.g., in a menu, icon, tabular, map, or grid format) in connection with other modules for presenting information and receiving inputs (e.g., configuration adjustments, such as inputs altering, updating, or changing the device settings). The inputs are communicated by the unified DM UI 107 to the SDMAUM 110, which in turn abstracts and forwards the inputs as described below. The unified DM UI 107 may also include local, terminal, web-based, and mobile interfaces and any similar interface that presents and provides information relative to the SDMAUM 110 (e.g., a single UI for DM, mobile front end UI, self-care/heal app, etc.).

The SDMAUM 110 may include a set of executable instructions configured to facilitate communication between the sub-modules of the SDMAUM 110 and hardware/software components external to the SDMAUM 110, including servers 130, 132. That is, the SDMAUM 110 may be configured to communicate directly with other applications, modules, models, devices, systems, and other sources through both physical and virtual interfaces. Further, the SDMAUM 110 may include executable instructions and specifications for routines, data structures, object classes, and variables that receive, package, present, and transfer data through a connection or over a network, as further described below. For example, the SDMAUM 110 may be configured to receive instructions from sources external to the computing device 101 and, based on those instructions, abstract interactions between the backend device components 104, the DM Apps 106, and the unified DM UI 107.

The SDMAUM 110 delivers a uniquely consistent approach to device management through abstraction. That is, by abstracting interactions between the backend device components 104, the DM Apps 106, and the unified DM UI 107, the SDMAUM 110 operates as a middleware for communications. In this example, middleware provides increased control and adaptation operations via single module scalability, as discussed above. In addition to single module scalability, the SDMAUM 110 may also provide enhanced device management capabilities, such as self-wakeup, polling, and policy control. Enhanced device management capabilities are further described below in reference to each sub-module to the SDMAUM 110.

The SDMAUM 110 may include the sub-modules of a Device Management Command and Event Listener (DM-CEL) 111, an Embedded Rules and Policy Engine (ERPE) 112, a Rules and Policy Access Control List (RPAC) 113 that stores a timing heuristic 114, an Embedded Heuristics and Analytics Engine (EHAE) 115, a Device Management Translation Engine (DMTE) 116, a Kernel/Drivers/Libraries Abstraction Engine (KDLAE) 117, and a Device Management Client Abstraction Engine (DMCAE) 118 to provide the above discussed operations.

Figure 2:
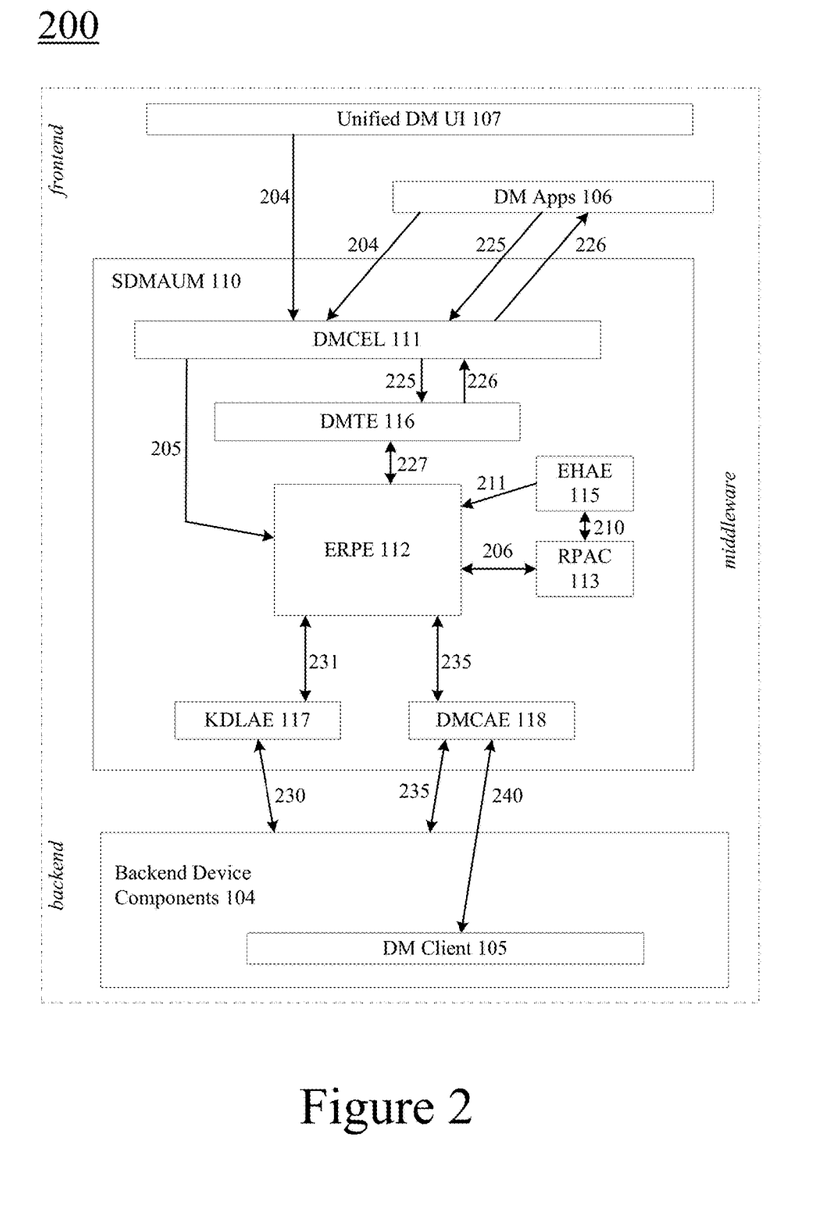
FIG. 2 illustrates an exemplary schematic of an operational relationship between the sub-modules of a secure device management abstraction and unification module.

FIG. 2 illustrates an exemplary schematic 200 of an operational relationship between the sub-modules of a SDMAUM 110. The exemplary schematic 200 is described in connection with the description of each sub-module.

The DMCEL 111 is configured to listen 204 for commands or queries from frontend components and external server requests (e.g., the DMCEL 111 generally invokes the operations of SDMAUM 110). For example, the DMCEL 111 listens for device events that may require the "wake-up" of a client or operation and passes 205 those requests on to the ERPE 112 for validation. Also, when the DMCEL 111 interacts with the ERPE 112 and RPAC 113, the DMCEL stores 206 device and programmatic events in a SDMAUM Event Log. The SDMAUM Event Log in conjunction with either the EHAE 115 or with an external analytics server may detect deviations from a baseline that indicate abnormal network or device events. A baseline may be a set of operating conditions in which, for example, no errors occur on a device or congestion on a network. Deviations, in general, are difference measurements between an observed value (e.g., baseline) and some other value (e.g., abnormal network or device events). Examples of deviations may include sensitivity measurements, when in relation to the baseline an upper or lower tolerance threshold is breached, and quantity measurements, when a number of deviations above or below the baseline is met or exceeded. The information in the SDMAUM Event Log may be used for the purpose of analytics or self-help and heal scenarios by feeding the information to front end applications or external servers. In addition, the DMCEL 111 utilizes APIs provided through the SDMAUM SDK to forward the call or interact with the ERPE 112 when a call is made from an application regardless of the application type.

The ERPE 112 is configured to validate that a calling entity (e.g., a frontend component) is legitimate and authorized to communicate with the backend components. The ERPE 112 utilizes 206 the policies present in the RPAC 113 to ensure authorization and security for these communications.

The RPAC 113 is a sub-module enabling the selective restriction of access to device resources and configurations. For instance, the RPAC 113 may include an access control list (ACL) that itemizes permissions attached to an object, application, or component (e.g., an ACL specifies approved operations). All calls to the SDMAUM 110 from the OS, device components, clients, applications, APIs, polling engine, DMCEL 111, DMTE 116, KDLAE 117, DMCAE 118, and external entities are passed through the ERPE 112, which in conjunction with the RPAC 113 ensures that the request is being generated or received from a legitimate authorized source (e.g., the associated application call contains a valid digital signature).

Digital signatures may be used to verify the applications or entities calling on the operations of the SDMAUM 110. The RPCAC 113 may store digital signatures of valid and authorized entities that have proper permissions to interact with the SDMAUM 110 and backend or frontend components.

Hashing heuristics may also be used to add additional security to calls for more secure interactions. In general, a hash heuristic may be any methodology or subroutine that maps data of variable length to data sets of a fixed length (e.g., hash values). For example, a hash heuristic may manipulate the data of a queue according hash tables or other data structures such that the data may be split or distributed into buckets based on their computed hash values (e.g., data may be read from the queue based on keys, such as a mobile number, an account number, a customer identification level, or other parameters).

On example of adding additional security by using digital signatures and hashing heuristics may be an authentication of frontend or backend entities during the communication process, where a digital signature may be utilized to ensure that an application has permissions to interact with the SDMAUM 110 and a backend component, and a hashing heuristic may be utilized to ensure that the application is who it claims to be (e.g., the hashing heuristic may also enable a hash authentication at the time of the application call).

In addition, responses from these sources (e.g., objects, applications, or components) may also be securely validated in the same manner.

The ERPE 112 may also be configured to enable polling of OTA and DM systems (e.g., over-the-air/device management server 130). In general, the ERPE 112 may directly poll, connect to, and download from OTA and device management systems the RPAC 113, which may include OTA polling intervals and a clock randomization heuristic (e.g., timing heuristic 114).

The timing heuristic 114 (e.g., code that creates and manages a table of start times in connection operating clock) may be used to avoid all activated devices from polling or updating at the same time, which in turn may overload network (e.g., 140) and/or server systems (e.g., 130). That is, the RPAC 113 stores the timing heuristic 114 that is used by the ERPE 112 to manage a virtual clock or timer created by the ERPE. The clock, based on the timing heuristic 114, triggers the SDMAUM 110 to self-wake and poll the DM systems to for RPAC 113 updates. The timing heuristic 114 of the RPAC 113 may thus govern the polling intervals and/or a specific date/time for polling. The DM systems, interacting with the SDMAUM 110 may also inform the computing device 101 as to whether or not it needs to check for available software updates.

The ERPE 112 also includes a retry mechanism for intelligent updates and content delivery that enables enhanced network scalability and operability. A retry mechanism for example may be code that manages/maintains a queue for retransmitting messages or data at different intervals. The specific intervals are defined in the RPAC 113 and utilized by the ERPE 112 in the event of a failed poll or operation call.

The ERPE 112 may utilize feedback loops to generate and/or receive network intelligence and alerts from OTA and DM systems to define Quality of Service (QoS) parameters. QoS parameters may enable the OTA and DM systems to modify the RPAC 113 to control polling intervals, software updates, and content delivery schedules. Feedback loops may be used in normal or emergency network situations in which the number of devices attempting to connect to the OTA and DM systems was causing congestion on the network or server. In this case the DM systems may inform the device to download a new RPAC 113 which may in turn tell the device to stop polling the OTA systems and give an alternate time at which it should try to connect again or give the DNS name of a backup DM system to poll. This may prevent a denial of service from occurring due to resource or network consumption.

Utilizing the ERPE 112 of the SDMAUM 110, the RPAC 113 may additionally be modified to update the OTA and DM system (e.g., over-the-air/device management server 130) on the computing device 101. For example, a user that has permission to configure a particular OTA and DM service, may alter, change, or update the OTA and DM system and configurations identified by the RPAC 113 (e.g., directly configure the polling intervals, an OTA and DM system name, or access method through the SDMAUM 110).

The ERPE 112 may be configured to control the secure access policy for APIs, client calls from other applications, and secure communications with network entities. Using digital signatures and interacting with public key infrastructure mechanisms, the ERPE 112 may ensure that all calls to backend clients are from authorized applications. Authorized applications include applications for which a set of executable instructions has been signed with a valid digital signature and is compared with signatures contained within an approved application and network entity list stored by the RPAC 113. The RPAC 113 may, in addition, store the digital public key signatures of approved network entities that have the rights to poll the SDMAUM 110 for access to SDMAUM operations or the clients that intact with the SDMAUM 110. The ERPE 112 may consult the RPAC signature and key store before performing actions on behalf of an application or network entity and use these keys for secure network communication, as well as for ensuring that calls came from valid and authorized device or network entities.

Using this secure signing method, front end applications may be made available to users, enabling user directed wake ups of device clients and the SDMAUM operability, such as in the case of self-care/heal applications or general troubleshooting scenarios. The application interacting with the SDMAUM 110 may have a valid digital signature in the RPAC 113 with a list of clients and operations it has access to. If, because of device or network issues, the client were unable to be woken by the DM systems through the SDMAUM 111 then the users may be directed to a front end application that may then have the ability to either pull the diagnostic information from the phone directly or wake the client up locally through an API call to the DMCEL 111.

This same methodology may be employed by self-care/heal applications that may in turn either use the operations of the EHAE 115 or an external analytics engine to identify potential device issues and define possible resolutions. By modifying the RPAC 113, applications may wake certain device operations to feed the diagnostic information to these applications on a defined schedule, via an events call from the DMCEL 111 or by user interactions with a front end application.

The EHAE 115 is configured to read 210 the events provided and stored by the RPAC 113. The EHAE 115 may analyze these events on an interval or constant basis to create an event baseline, determine when abnormal conditions occur on the device, and provide alerts 211 to either backend clients or front end applications through the ERPE 112. The EHAE 115 may utilize heuristic rules and policies provided to the RPAC 113 by the ERPE 112 to modify the behavior of the analytics engine providing for customization by device type, make, and model or changing network conditions (e.g., the analytics engine may be according to whether the device is a smart-phone or tablet computer). The EHAE 115 by using rules downloaded by the ERPE 112 and held in the RPAC 113 may alert users or administrators to specific device issues. Further, the downloaded rules may be heuristic rules specific to a device make and model, and changed if there are updates to the baselines of those devices. This modification process may allow the EHAE 115 to be adaptable to specific devices, changing device conditions, or network events and therefore offer more usable help and alerting capabilities.

The EHAE 115 may also offer general troubleshooting information to a user through a front end application that may interact with the SDMAUM 110. That EHAE 115 may further provide integration with virus and malware scanning applications. In this scenario, device events (dropping network connection, high CPU) may be coupled with heuristic information from anti-virus software to alert a user to a device condition (high CPU utilization) and a potential cause for the issue (malware or anti-virus software downloaded to the device). This interaction may allow the virus software to interact either directly with the ERPE using secure code signing and digital certificates or through API calls to the DMCEL. A digital certificate is a set of executable instructions or an electronic document that utilizes a digital signature to verify a software license or licensed identity.

The DMTE 116 may be configured to translate device commands from the DMCEL API (e.g., calls from frontend components that are forwarded 225 through DMCEL 111) to commands that can be used by embedded agents (e.g., a set of executable instructions that acts on behalf of another program), 3rd party device management clients, and/or device management clients. This enables calls from user applications to utilize a standardized API so that, regardless of the backend client, the user application may communicate in the same consistent manner with the SDMAUM 110. In addition, for backend communication, the DMTE 116 is configured to convert 226 responses from embedded agents, 3rd party clients, or device management clients to either a unified API translated response to the user application layer or another communication standard to preserve legacy, 3rd party DM system solutions, or BYODM implementations. The DMTE 116 may also be configured validate 227 all calls with the ERPE 112.

For example, when a DM request comes from the service provider's DM system, the SDMAUM 110 receives the request while knowing that there is no DM client on the device that supports the service provider's DM call, translates the service provider's DM commands to the TR-069 standard, and sends those commands to the TR-069 compliant client. In turn, the return communication is then translated from TR-069 to Service Provider's DM communication protocol. This operability enables the SDMAUM 110 to be scalable to changing device clients and standards. However, if the service provider only supports DM operations on its network then it may have to add support for TR-069 in order to add those devices or develop a DM client for those devices. The DMTE 116 removes these dependencies, as DM control communications may be translated by the DMTE 116 to continue to support the current and future architecture of the service provider network and infrastructure.

The KDLAE 117 is configured to interact 230 with the OS layer Kernel, device drivers, and libraries and extract information requested by the DMCEL API. The DMCEL API, once the request is received, may either work through the DMTE 116 to translate the commands if necessary or may send the request 231 to the ERPE 112, which may in turn examine the RPAC 113 to ensure that the calling entity is authorized to receive the specific data it requested. If so, the ERPE 112 may pass the request to the KDLAE 117, which then interacts with the proper OS level components or kernel and retrieves the information.

The KDLAE 117 may also be expanded to include support for chipset data extraction and logging by including any API calls for the chipset as a valid source and destination entity within the RPAC 113.

The DMCAE 118 is configured to operate in a similar fashion to the KDLAE 117. The DMCAE 118 interacts 235 with the device management clients and in conjunction with the ERPE 112 may be used to wake up any of the clients present in the RPAC 113 that are approved for interaction. The DMCAE 118 may also interact directly 240 with the DM standard client and behave as a virtual server in the communication path. In this manner the standard client may send and receive commands to the DMCAE 118, as if it were interacting with a DM system. This allows for the flexibility of utilizing the DM clients already present on the device or to expand support to include new standard based clients without having to modify the communication standards for these clients. These clients may interact with the DMCAE 118 as if it were a DM or OTA systems on the network.

The DMCAE may also be configured to self-wake the client component, but then remove itself from the communication pathway. That is, to continue support for standard clients while removing the need for the SMS wakeup method, the DMCAE 118 may be used to wake up the client when there is an SMS failure. After wake up, the client may continue to communicate with the standard systems it was originally configured to use. This policy may be configured within the RPAC 111 and instituted by the ERPE 112.

The DMCAE 118 may also be configured to extend support for future standards and clients by creating a layer between the DMCEL 118 and standard DM client. That is, because the DMCAE 118 acts as a virtual server, the standard does not have to be modified and the DMCAE name becomes the DM server name for those clients. The operations and communications path can be modified via an update to the RPAC 113, which may then change the interactions between the DMCAE 118 and DM client through ERPE 112 operations.

Thus, the SDMAUM 110 performs middleware operations and provides enhanced device management capabilities by utilizing the sub-modules described above to abstract interactions between the backend device components 104, the DM Apps 106, and the unified DM UI 107. Additional operations and capabilities of the SDMAUM 110 may include adapting to changing DM standards, management clients, OS APIs by maintain the consistent communication approach to interacting with components that have not been updated or changed (e.g., via the APIs of the SDMAUM 110). The operations and capabilities of the SDMAUM 110 may also include fortifying the system 100 through granular control of computing devices 101 by the SDMAUM 110 via enhanced security mechanisms (e.g., trusted modules, signed APIs, and trusted applications).

The SDMAUM 110 may also be OTA programmable. That is, the SDMAUM 110 through the ERPE 112 may be configured to offer support for specific DM protocols that keep the SDMAUM 110 "light weight" while enabling support for multiple computing environments and communication protocols. In this way, a subscriber could subscribe to TR-069 device support and Open Mobile Alliance Device Management network support in which the SDMAUM 110 may be updated with the set of commands used by the DMTE 116 to translate between these two protocols. Being programmable also may enable support of proprietary protocols by enabling customers to work with the SDMAUM 110 provider and have proprietary protocol support and translation coded into the module via the DMTE 116.

The SDMAUM 110 may further collect diagnostics from computing device APIs and DM clients; communicate computing device information from backend device components 104 to the DM Apps 106, and the unified DM UI 107; and supply the collected diagnostics to analytics engines (e.g., the KDLAE 117 and the DMCAE 118). The SDMAUM 110 may also provide support, management, and granular control (e.g., increased operability) of mobile-to-mobile (M2M) devices, bring your own device (BYOD), bring your own device management (BYODM), and dual persona initiatives. In turn, the SDMAUM 110 may simplify device requirements while streamlining and optimizing device management development, testing, and certification, all of which decreases the time to production for new device management operations and OS changes/updates.

In addition, the middleware operations and enhanced device management capabilities of the SDMAUM 110 may generate new business opportunities and initiatives, such as software licensing and utilization tracking Software licensing is a contractual agreement granting a party an explicit right to the use or redistribution of a particular copy of software. Utilization tracking is a scheme that logs the operations and data used by a computing device.

For instance, the SDMAUM 110 may employ the ERPE 112 to validate a computing device 101 and the EHAE 115 to log the activity. Then the SDMAUM 110 may report the log to a server that outputs a bill or charge to the owner of the computing device 101. For example, the SDMAUM 110 architecture may permit licensing of the SDMAUM 110 to third party vendors. Thus, the third party vendor may take advantage of the security and control offered by the SDMAUM 110 while the licensor charges for the software service accordingly.

Licensing of the SDMAUM 110 may also include licensing of the individual modules and operation of the SDMAUM 110. For instance, the RPAC 113 may store a license key file that may include the licensed operations and services the SDMAUM 110. A license key file may allow granular control and licensing of SDMAUM 110. The key file may be downloaded and installed at device activation when provisioning occurs. Key lifetimes may also be used to control how long the SDMAUM 110 is licensed for and handle deactivation if the keys expire. Keys may also control update and software assurance operability. Subscribers that "subscribe" to SDMAUM 110 software assurance may automatically become eligible for updates of the SDMAUM 110 itself, which may be controlled by interactions with a DM server, and the ERPE 112, and license key file. Licensed subscribers may also be upgraded when enhanced versions of the SDMAUM 110 became available.

In one example of licensing, a third part server of a subscriber may interact with and control the operation of the SDMAUM 110 based on the provisioned services within the license key file along with the RPAC 113. If the license key file is not present, then the SDMAUM 110 is not activated and therefore sits idle on the device without utilizing device resources. In this fashion, the subscriber must update the license key file to access the operability provided by the SDMAUM 110. Thus, when calls are made to the SDMAUM 110, the service making the call may either be allowed or denied based on the license key file as governed by the ERPE 112.

Other business opportunities and initiatives may include licensing of SDMAUM SDK to enterprise applications allowing vendors and wholesalers to interact with the SDMAUM 110, providing particular software development kit (SDK) licensing to original equipment manufacturers (OEMs) via development portal, enabling licensing of SDMAUM Client to non-branded OEMs; and providing DM service and certification via the SDMAUM licensing. In addition, the utilization tracking operations of the SDMAUM 110 may permit the monetization of OTA, the data service associated with OTA, and/or FOTA operations.

Servers 130, 132, as noted above, are computing devices that include a processor and a memory (e.g. 106 and 107, respectively). In the case of FIG. 1, server 130 is an over-the-air/device management (OTA/DM) server 130 and server 132 is a third party client server 132.

The OTA/DM server 130 may be service provider computing device that manages the software updates and device configuration for computing device 101 via over-the-air programming. Over-the-air programming (OTA) generally includes distributing new software updates, configuration settings, and updating encryption keys to computing devices (e.g., OTA utilizes wireless mechanisms to send provisioning data or update packages for firmware or software updates to computing devices). OTA provides a central location for pushing an update to all the computing devices 101 on a network that applies immediately. The computing devices are generally unable to refuse, defeat, or alter that update. For example, OTA operations may be provided to computing devices via the *228 service code standard, which enables device configurations and preferred roaming lists to be updated. OTA may also permit the management of computing device 101 operability, including renumbering handsets, updating applications, and updating subscriber data.

The third party client server 132 may be a third party computing device that manages the software updates and device configuration particular to the proprietary software of the third party. In general, third party software must be updated in accordance with OS and DM upgrades; however, because of the middleware abstraction by the SDMAUM 110, frontend third party applications may remain unmodified.

In addition, servers 130, 132 may be any computing device acting as databases, data repositories or other data stores that includes any type of data source and/or file system that operates to support the SDMAUM 110. For instance, data sources may include DM client updates, along with licenses (e.g., license the permit control and access to the device by third parties platforms) relating to a DM access and configurations and/or device operability.

In general, databases, data repositories or other data stores (e.g., servers 130, 132) described herein may include various kinds of mechanisms for storing, providing, accessing, and retrieving various kinds of data, including a hierarchical database, a set of files in a file system, an application database in a proprietary format, a relational database management system (RDBMS), etc. Each such data store may generally be included within or external to a computing system and/or device (e.g., servers 130, 132) employing a computer operating system such as one of those mentioned above, and/or accessed via a network or connection in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

Further, in some examples, the elements of computing device 101 and servers 130, 132 may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the operations described herein.

A network 140 may provide the infrastructure through which the computing device 101 and servers 130, 132 communicate. In general, a network (e.g., network 140) may be a collection of computers and other hardware to provide infrastructure to establish virtual connections and carry communications. For instance, a network may be an infrastructure that generally includes edge, distribution, and core devices and provides a path for the exchange of information between different devices and systems (e.g., between the computer devices 101 and servers 130, 123). Further, a network may be any conventional networking technology, and may, in general, be any packet network (e.g., any of a cellular network, global area network, wireless local area networks, wide area networks, local area networks, or combinations thereof, but may not be limited thereto) that provides the protocol infrastructure to carry communications. The network 140 is representative, and thus while a single cloud illustrates the network 140, this illustration may represent a single network, a combination of different networks components and technologies, and/or a plurality of networks, as described above.

Connections 147, 148, 149 may be wired or wireless connections between two endpoints (devices or systems) that carry electrical signals that facilitate virtual connections. Examples of connections 147, 148, 149 may be any transmission media including coaxial cables, copper wire, fiber optics, and the like. Virtual connections are comprised of the protocol infrastructure that enables communication to and from computing device 101 and servers 130, 132. For instance, connections 147 may be the wireless connections between computer device 101 and towers 141, connections 148 may be the wired connections between towers 104 and gateway equipment 148, and connections 149 may be the wired connection between the gateway equipment 148 and servers 130, 132. Further, the combination of connections 147, 148, 149 provide the virtual connection between computing device 101 and servers 130, 132.

The exemplary communication system 100 and components (e.g., the SDMAUM 110 and sub-modules thereof) will now be described with reference to the exemplary process flow 300 of FIG. 3.

Figure 3:
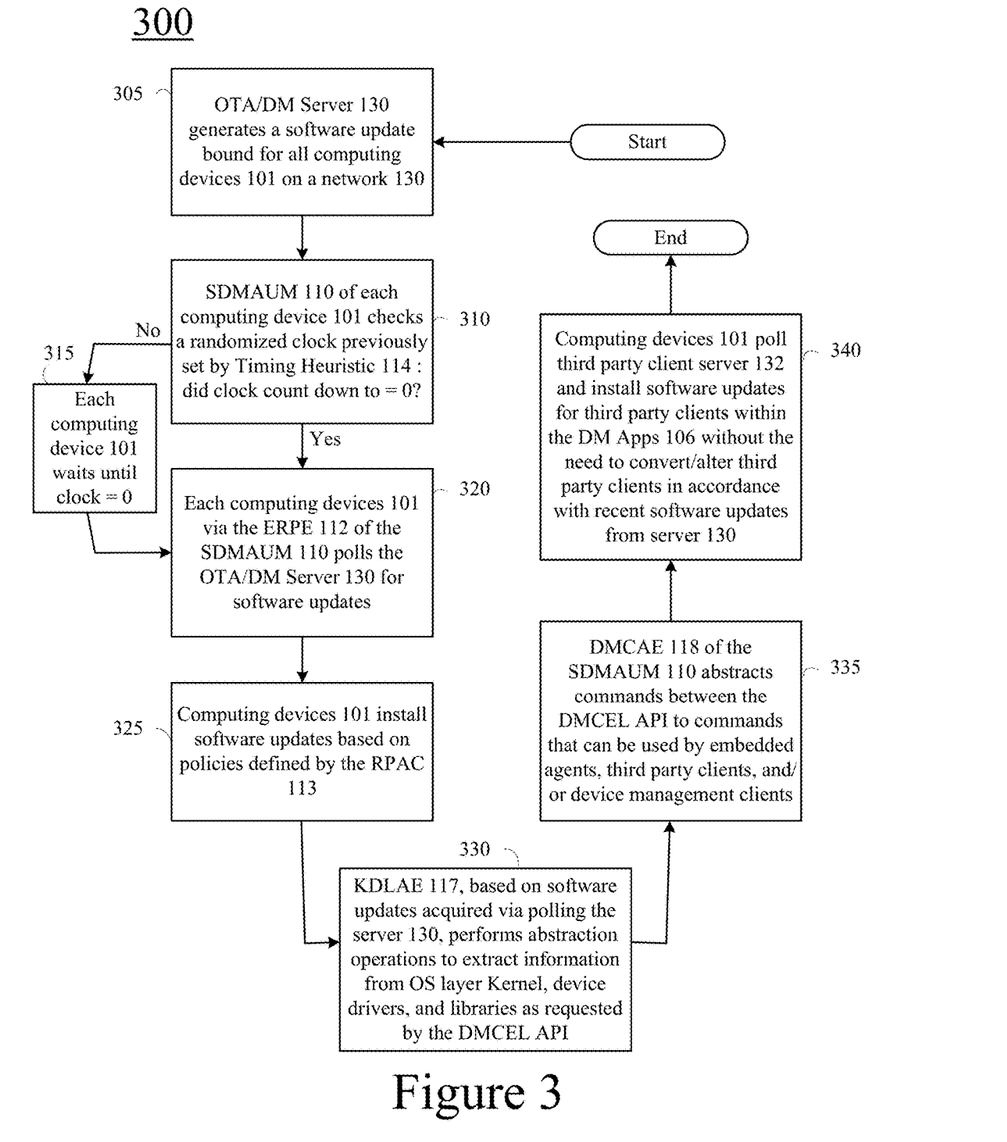
FIG. 3 illustrates an exemplary process flow for executed by a secure device management abstraction and unification module.

In general, FIG. 3 illustrate an exemplary process flow 300 executed by SDMAUM 110. Note that the SDMAUM 110 is a piece of the entire SDMAUM architecture that spans the entirety of the system 100 and controls the configuration settings for a plurality of computing devices 101 in the network 130. Thus, when the exemplary process flow 300 is executed across the system 100, operability and security of the system and network 130 are optimized while cost and downtime minimized. In turn, similar to how the SDMAUM 110 provides adaptable, secure, and scalable device management options for a singular computing device 101, the installation of the SDMAUM 110 on multiple computing devices 101 creates an SDMAUM architecture that provides adaptable, secure, and scalable device management options for the system 100. For instance, an SDMAUM architecture provides system wide scalability by enabling, updating, controlling, and securing multiple and/or various computing devices with standard and/or customized set of executable instructions. In turn, when any backend or frontend component is updated, the SDMAUM architecture permits a single modular update to each SDMAUM 110 on each computing device 101 of the system 100 rather than a full system overhaul.

The exemplary process flow 300 begins when the OTA/DM Server 130 generates 305 a software update bound for a plurality of computing devices 101 on a network 140. At this time, computing devices 101 with inactive SDMAUMs 110 may be activated by the OTA/DM server 130 via a communication across the network 130 to the respective DMCELs 111, which are in a listening state as described above. Once activated, the SDMAUM 110 via the ERPE 112 downloads from OTA/DM Server 130 the RPAC 113, which includes OTA polling intervals and the timing heuristic 114. The timing heuristic 114 sets the randomized clock which informs the SDMAUM 110 poll the OTA/DM Server 130 for updates to the RPAC 113 (computing devices 101 that already have active SDMAUMs 110 also already have their randomized clock set).

Next, the SDMAUM 110 of each computing device 101 checks 310 whether the randomization clock has counted to the interval designated by the RPAC 113. For instance, if the randomized clock is a decrementing counter with an interval set to the equivalent of 168 hours (e.g., one week), then when the SDMAUM 110 may proceed to poll 320 the OTA/DM Server 130 when the clock reaches zero (e.g., after a week has passed). For each computing device in which the clock is currently decrementing, then computing device 101 waits 315 the interval is complete before polling 320 the OTA/DM Server 130.

When each respective interval designated by each respective RPAC 113 is complete, each computing device 101 via the ERPE 112 of the SDMAUM 110 polls 320 for software updates from OTA/DM Server 130. The ERPE 112 then downloads software updates and configurations changes, if available, while utilizing the RPAC 113 to validate the software updates and configurations changes. In addition, in the event of a failed poll or operation call to the OTA/DM Server 30, the ERPE 112 may utilize the retry mechanism as defined in the RPAC 113.

If validated (e.g., the policies defined by the RPAC 113 approved the updates and changes), the SDMAUM 110 communicates with the modules of the computing device 101, such as the backend device components 105, to implement or install 325 the software updates and configurations changes.

Next, the KDLAE 117 performs abstraction 330 operations based on updates and changes implemented by the SDMAUM 110 to extract information from OS layer Kernel, device drivers, and libraries as requested by the DMCEL API.

In turn, the DMCAE 118 of the SDMAUM 110 abstracts 335 commands between the DMCEL API to commands that can be used by embedded agents, third party clients, and/or device management clients (e.g., DM Apps 106 and Unified DM UI 107).

With the SDMAUM 110 abstracting commands and acting as middle ware between frontend and backend device component, computing devices 101 may now poll 340 the third party client server 132 and install software updates for third party clients within the DM Apps 106 without the need to convert/alter third party clients in accordance with recent software updates from server 130.

Next, the process 300 ends.

While one exemplary process flow 300 is shown in the FIG. 3, this flow is not intended to be limiting. Indeed, additional or alternative flows and/or implementations may be used. For example, the exemplary process flow 300 may be split into two flows. A first flow may include when an application or OTA/DM Server 130 may interact with the SDMAUM 110 via the DMCEL 111 to request diagnostic or configuration information from the SDMAUM 110. Based on the information being requested and if the application or network entity had rights (as approved by the ERPE 112 and RPAC 113), a second flow may include when the KDLAE 117 or DM client 105 queries for the information that may be supplied back to SDMAUM 110 for processing (DMTE 115) or security check (ERPE 112) and then forwards the information back to the requester. The second flow may also be used for interactions that involve configuration updates or device level changes. Implementing exemplary process flow 300 in separate flows, thus, illustrates that interactions in the system 100 are not required to be initiated by network systems or software update processes (e.g., the SDMAUM 110 provides flexibility based on customer needs).

In addition to the above described exemplary process flow 300, the SDMAUM architecture may implement other features, thus further extending the operability of computing devices 101. Examples of other features include Machine to Machine (M2M) applications, BYOD/Dual Persona applications, and connected home applications.

M2M application may be a "thin" version of the SDMAUM 110 that is licensed to third party partners and/or vendors. This may allow third party partners and/or vendors to control the SDMAUM 110 during device/module/sensor activation. During activation, the ERPE 112 may modify access control lists (ACLs) by device type (e.g., E-health sensor life critical, home temperature monitor non-critical, etc.) which in turn may offer granular policy and security controls for how the computing device 101 is managed. Further, the "thin" version of the SDMAUM 110 may be offered as a service to users who may have their devices provisioned and managed by type. This may enable flexible billing scenarios for particular M2M device services to be billed by the device type and guaranteed QoS levels. The OTA installation and activation of SDMAUM 110 features also supports wholesale M2M device providers that need OTA operability. That is, instead of certifying the device for use with a particular service provider's OTA and/or DM requirements the vendor may purchase licenses for the SDMAUM 110. When the computing device 101 activates, the SDMAUM 110 may be downloaded and installed as part of a software update which may immediately make the device compliant with the service provider's OTA and/or DM requirements.

Regarding BYOD/Dual Persona applications, because the SDMAUM 110 utilizing the ERPE 112 can install and update ACLs is generally based on the user that logs into the computing device 101, the SDMAUM 110 may be configured to permit BYOD/Dual Persona scenarios where two ACLs may be installed on the computing device 101. For instance, one ACL may be an Enterprise or Corporate persona and another ACL be a personal persona. Thus, the Enterprise Administrator may control operations relating to Enterprise operability while "blacklist operations" may be deemed personal and private, to ensure the user's privacy. This also helps to limit privacy liability for corporations looking to control access to the corporate network while allowing employees the flexibility of utilizing their own devices because the enterprise administrators may not have access to data and/or operations deemed private and personal yet allow them to control corporate policies on the device.

In addition, the SDMAUM 110 using the ERPE 112 and RPAC 113 can "white list" certain OTA and DM operations so that the service provider (regardless of Enterprise Policy) may have access to those enabled operations. These operations may include but are not limited to firmware updates, diagnostics, polling, device/OS updates. This may offer the flexibility to continue to control those operations which may endanger the service provider's network or result in user dissatisfaction or technical issues as in the case of an enterprise policy blocking a device software update that prevents a user from receiving a critical update that then results in increased network traffic or poor device performance which ultimately leads to user dissatisfaction. Another use case may be the "white listing" of diagnostic operations so that the user may continue to utilize any self-care/heal applications or allow user service representatives access to these diagnostics if the user calls the service provider for device issues instead of the Enterprise Administrator.

Regarding connected home applications, a service provider may support computing devices 101 through the DMTE 111 operability of the SDMAUM 110 that have non-standard or unsupported DM clients.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A computing device comprising a memory, a processor, and at least one physical component, the memory storing a frontend component, a backend component, and an abstraction and unification module, the backend component including executable instructions to at least one of configure and operate the at least one physical component, the frontend component including executable instructions to at least one of present and run an application on the computing device, and the abstraction and unification module being executable by the processor of the computing device to provide operations comprising:

installing an update for the backend component generated by a first external device external to the computing device;

receiving from the frontend component a request for information located within the backend component of the computing device, the request including a digital signature;

translating the request into a standardized application programming interface (API) protocol usable by the backend component;

validating that the frontend component is authorized to receive the information specified in the request by comparing, by a rules and policy engine sub-module of the abstraction and unification module, the digital signature of the request with signatures contained within an approved application and network entity list stored in a rules and policy access control list sub-module of the abstraction and unification module;

in response to validating that the frontend component is authorized, passing the request to an abstraction engine that extracts the information from the backend component via abstraction operations;

translating the information into the standardized API protocol readable by the frontend component;

providing the information extracted from the backend component to the frontend component; and installing an update for the frontend component generated by a second external device external to the computing device;

wherein the executable instructions to present an application on the computing device includes generating and displaying a user interface on a display of the computing device, and the executable instructions to run an application includes a continuous operation of a timer feature of a clock application regardless of whether the user interface is on the display of the computing device.

2. The computing device of claim 1 further comprising:
polling the first external device and the second external device to identify whether the updates for the frontend and backend components are available;
receiving responses to the respective polling from the first external device and the second external device; and
initiating wireless transfers of the updates with the first external device and the second external device when the responses indicate that the updates are available.

3. The computing device of claim 2, wherein the operations of the abstraction and unification module further comprise:
utilizing a timing heuristic configured to trigger the respective polling of the first external device and the second external device based on a polling interval.

4. The computing device of claim 1, wherein the rules and policy engine is configured to associate permitted operations with the backend and frontend components and to define retry procedures for a failed polling operation from the computing device to at least one of the first external device and the second external device.

5. The computing device of claim 4, wherein validating that the frontend component is authorized to receive the information specified in the request includes utilizing the rules and policy engine to determine whether the request is one of the permitted operations.

6. The computing device of claim 1, wherein the operations of the abstraction and unification module further comprise:
listening for queries that enable the abstraction and unification module to perform the operations.

7. The computing device of claim 1, wherein the operations of the abstraction and unification module further comprise:

generating an event baseline in accordance with an event log, and
outputting an alert to an external device by operating an analytics engine configured to detect deviations from the event baseline.

8. The computing device of claim 7, wherein the operations of the abstraction and unification module further comprise:
storing the request and the extraction as an event in the event log.

9. A method, comprising:
installing an update for the backend component of a computing device, the update being generated by a first external device external to the computing device, the backend component including executable instructions to at least one of configure and operate at least one physical component of the computing device;
receiving, by an abstraction and unification module, from a frontend component of the computing device a request for information located within the backend component of the computing device, the request including a digital signature, the frontend component including executable instructions to at least one of present and run an application on the computing device, the executable instructions to present an application on the computing device including generating and displaying a user interface on a display of the computing device, and the executable instructions to run an application including a continuous operation of a timer feature of a clock application regardless of whether the user interface is on the display of the computing device;
translating the request into a standardized application programming interface (API) protocol usable by the backend component;
validating, by the abstraction and unification module, that the frontend component is authorized to receive the information specified in the request by comparing, by a rules and policy engine sub-module of the abstraction and unification module, the digital signature of the request with signatures contained within an approved application and network entity list stored in a rules and policy access control list sub-module of the abstraction and unification module;
in response to validating that the frontend component is authorized, passing, by the abstraction and unification module, the request to an abstraction engine that extracts the information from the backend component via abstraction operations;
translating the information into the standardized API protocol readable by the frontend component;
providing, by the abstraction and unification module, the information extracted from the backend component to the frontend component; and
installing an update for the frontend component generated by a second external device external to the computing device;
wherein the frontend component, the backend component, and the abstraction and unification module are stored on a memory of the computing device.

10. The method of claim 9 further comprising:
polling the first external device and the second external device to identify whether the updates for the frontend and backend components are available;
receiving responses to the respective polling from the first external device and the second external device; and initiating wireless transfers of the updates with the first external device and the second external device when the responses indicate that the updates are available.

11. The method of claim 10, further comprises:
utilizing a timing heuristic configured to trigger the polling of the external device based on a polling interval.

12. The method of claim 9, further comprises:
generating an event baseline in accordance with an event log, and
outputting an alert to an external device by operating an analytics engine configured to detect deviations from the event baseline.

13. The method of claim 12, further comprises:
storing the request and the extraction as an event in the event log.

14. A non-transitory computer readable medium storing a frontend component, a backend component, and an abstraction and unification module, the backend component including executable instructions to at least one of configure and operate at least one physical component of a computing device, the frontend component including executable instructions to at least one of present and run an application on the computing device, the module being executable to provide operations comprising:
installing an update for the backend device generated by a first external device external to the computing device;
receiving from the frontend component of the computing device a request for information located within the backend component of the computing device, the request including a digital signature;
translating the request into a standardized application programming interface (API) protocol usable by the backend component;
validating that the frontend component is authorized to receive the information specified in the request by comparing, by a rules and policy engine sub-module of the abstraction and unification module, the digital signature of the request with signatures contained within an approved application and network entity list stored in a rules and policy access control list sub-module of the abstraction and unification module;
in response to validating that the frontend component is authorized, passing the request to an abstraction engine that extracts the information from the backend component via abstraction operations;
translating the information into the standardized API protocol readable by the frontend component;
providing the information extracted from the backend component to frontend component; and
installing an update for the frontend component generated by a second external device external to the computing device;
wherein the executable instructions to present an application on the computing device includes generating and displaying a user interface on a display of the computing device, and the executable instructions to run an application includes a continuous operation of a timer feature of a clock application regardless of whether the user interface is on the display of the computing device.

15. The medium of claim 14 further comprising:
polling the first external device and the second external device to identify whether the updates for the frontend and backend components are available;
receiving responses to the respective polling from the first external device and the second external device; and
initiating wireless transfers of the updates with the first external device and the second external device when the responses indicate that the updates are available.

16. The medium of claim 15, wherein the operations of the abstraction and unification module further comprise:
utilizing a timing heuristic configured to trigger the polling of the external device based on a polling interval.

17. The medium of claim 14, wherein the operations of the module further comprise:
generating an event baseline in accordance with an event log, and
outputting an alert to an external device by operating an analytics engine configured to detect deviations from the event baseline.

* * * * *